(12) United States Patent
Bisazza

(10) Patent No.: US 7,027,481 B2
(45) Date of Patent: Apr. 11, 2006

(54) METHOD AND ELECTRIC FURNACE FOR MELTING VITREOUS MATERIALS

(75) Inventor: Giuseppe Bisazza, Vicenza (IT)

(73) Assignee: Trend Group SpA, Vicenza (IT)

( * ) Notice: Subject to any disclaimer, the term of this patent is extended or adjusted under 35 U.S.C. 154(b) by 0 days.

(21) Appl. No.: 10/510,495

(22) PCT Filed: Apr. 8, 2003

(86) PCT No.: PCT/IB03/01271

§ 371 (c)(1),
(2), (4) Date: Oct. 7, 2004

(87) PCT Pub. No.: WO03/084884

PCT Pub. Date: Oct. 16, 2003

(65) Prior Publication Data

US 2005/0175060 A1    Aug. 11, 2005

(30) Foreign Application Priority Data

Apr. 11, 2002   (IT)   ............................ VI2002A0065

(51) Int. Cl.
*C03B 5/027*    (2006.01)
*F27D 17/00*    (2006.01)

(52) U.S. Cl. ........................................... 373/32; 373/9

(58) Field of Classification Search ............ 373/27–35, 373/41, 8–9; 65/135.8, 339, 340–342
See application file for complete search history.

(56) References Cited

U.S. PATENT DOCUMENTS

| 4,143,232 A | | 3/1979 | Bansal et al. |
| 4,900,337 A | * | 2/1990 | Zortea et al. ................. 65/345 |
| 5,613,994 A | * | 3/1997 | Muniz et al. ................. 373/27 |

FOREIGN PATENT DOCUMENTS

| DE | 564 491 C | 11/1932 |
| DE | 1 080 740 | 4/1960 |

* cited by examiner

*Primary Examiner*—Tu Hoang
(74) *Attorney, Agent, or Firm*—Dykema Gossett PLLC

(57) ABSTRACT

A method and apparatus for melting vitrifiable materials employs a melting tank for containing a molten bath with an upper surface. The tank has a floor and side walls and channels for discharging molten materials. A crown is situated above the floor and vitrifiable materials are introduced onto the upper surface of the molten bath. A plurality of electrodes having a selected shape and position are situated inside the tank for melting the vitrifiable materials with electric current. The electrodes rest on the floor and extend across the furnace to the opposite wall so as to reduce the head of the molten bath and consequently reduce melting time and energy consumption.

15 Claims, 3 Drawing Sheets

METHOD AND ELECTRIC FURNACE FOR MELTING VITREOUS MATERIALS

TECHNICAL FIELD

The present invention relates to the technical field of vitreous materials and in particular relates to a method and an electric furnace for the production of vitreous mosaic materials, ceramic frits and similar products as well as for the vitrification of waste.

BACKGROUND ART

It is known that batch furnaces or crucible furnaces or continuous canal furnaces, which differ from each other as regards the procedures for the melting process, may be used for the production of vitreous materials, such as, for example, a mosaic product composed of a vitreous paste.

In batch furnaces, the raw materials contained in the crucible are firstly heated to a high temperature in order to melt them and form the vitreous mixture, and other raw materials such as, for example, silica sand, are then added in order to obtain an opacifying effect and a crystalline grain; finally, said materials are cooled, before being conveyed to suitable forming machines in order to produce the end product, for example a vitreous mosaic material.

Owing to these process characteristics, crucible furnaces are suitable for small production outputs, ranging between 100 and 3000 kg of vitreous product per day. In continuous furnaces, the various stages of production are distributed spatially, but are performed simultaneously. The raw materials forming the primary vitrifiable mixture are melted continuously inside a tank which is connected by means of submerged passage or gully to a canal. Substances necessary for producing the opacifying effect are added into the canal. A casting tank which supplies the forming machines is situated at the other end of the canal.

Unlike crucible furnaces, continuous furnaces are suitable for greater production outputs, exceeding 5000 kg of vitreous product per day.

Ceramic frits are produced industrially in furnaces of the continuous type. At present melting furnaces of the oxygen-combustion type are in particular preferred. In view of their small dimensions, for these applications the use of efficient, but costly systems for pre-heating the comburent air, such as regenerators, as used in large glass tank furnaces, is avoided. Thus, the fumes are conveyed directly to the flue, still at a high temperature. Owing to the notable environmental impact of the flue emissions, in accordance with recent legislation, furnaces for ceramic frits must also be equipped with a fume filtration device of the sleeve filter type. These plants not only have a high installation cost, but are also costly to manage on account of the large volume of fumes due also to mixing with the ambient air necessary in order to lower the temperature to levels compatible with the filters used.

Furnaces for vitrification of waste at present constitute a type of plant which is still in the experimental stage. The raw materials which form the vitrifiable mixture consist, wholly or partly, of toxic waste of inorganic origin, such as for example the residual matter from RSU incinerators and the dross resulting from the processing of metals and composite materials containing asbestos. The aim of this type of treatment of dangerous waste is to produce glass which has a suitable chemical stability and which, even though not completely refined, may be reused as a semi-processed product in the ceramics, glass fibers and foamed glass industry for thermal insulation or files to be used in the building sector.

In all the abovementioned production processes, the method of melting the vitreous products, such as that for ceramics frits and for vitrification of waste, is characterized by the production of glass which is not entirely devoid of internal air bells, namely is not refined. The vitrifiable mixture, moreover, may contain elements which evaporate easily and may therefore have a significant and problematic impact on the environment.

Finally, since the composition of the mixture is subject to frequent changes in order to produce products with a different color and opacifying effect, in order to speed up the material replacement operations, it is preferred to use very low heads of glass.

Generally a drawback of certain solutions consists in the fact that the thickness of the layer of vitrifiable mixture, which is deposited on the surface of the molten bath, is limited and is not sufficient to screen the dispersions which are irradiated towards the crown of the furnace. Thus, some components in the mixture may easily evaporate and mingle with the discharge fumes, thereby contaminating them.

Owing to their high temperature and harmful content, the existing legislation governing pollution requires the use of costly filtration plants.

German patent No. 1,080,740 discloses a furnace for vitreous materials having a tank with a polygonal shape in plan view, suitably designed to ensure a uniform temperature inside the molten bath. Electrodes are mounted on the side walls of the furnace and towards the central zone of the tank and, being suitably energized by electric transformers generate a diffused current within the molten bath. This diffused current heats the vitreous mixture contained in the tank as a result of the Joule effect. During continuous operation, the vitrifiable mixture is deposited on the upper surface of the molten bath so as to form a uniform layer, while an opening on the floor and close to the corner of the tank allows the molten glass to flow out.

A disadvantage of the solution considered consists in the considerable thickness of the head of glass, due to the shape of the tank and the arrangement of the electrodes. This constitutes a limitation when the vitrification mixture must be changed frequently, since it increases the time required for changing the mixture of raw materials to be vitrified.

A second disadvantage of the solution in question consists in the fact that the ends of the electrodes are freely immersed in the molten bath, resulting in a high intensity of current in the vicinity of the said ends. For this reason, the immersed ends of the electrodes are subject to rapid wear.

DE-C-564491 discloses an electric furnace with a plurality of electrodes placed on the floor. Each electrode has a variable cross-section and an interruption in correspondence of a central area of the bath. This interruption defines an internal space in which the convection currents of the melting bath originate. The variable cross-section of the electrodes is specifically directed to provide a vertical extension of the melting bath and does not prevent an increase in the overall head, change time and power consumption of the melting process.

U.S. Pat. No. 4,143,232, which is considered the nearest prior art on which is based the preamble of claims 1 and 5, comprises a glass furnace comprising three groups of electrodes which are positioned in the melting tank at three different levels in order to yield convection currents in the molten bath. The groups of electrodes which are placed at the upper level far from the floor play a very important role during the process as they allow to keep the molten bath flatter and more stable. Moreover, the other two groups of electrodes are placed at different levels and distances from the side walls of the tank in order to improve the control of the convection currents and of the shape of the melting bath. This known furnace has no provision for reducing to a minimum the head of the molten bath, the time for changing the primary batch and the power consumption.

DISCLOSURE OF THE INVENTION

A main object of the present invention is that of eliminating the drawbacks mentioned above by providing a method and a furnace for the production of vitreous mosaic materials, ceramic frits and similar products as well as for the vitrification of waste, which have the characteristics of low-cost and limited impact on the environment.

A particular object is that of providing a cold-crown furnace which is able to lower the temperature and the quantity of polluting substances contained in the fumes discharged into the atmosphere.

A further object of the invention is that of providing an electric furnace which allows a reduction in the time required to change the vitrifiable material.

Another particular object is that of providing an electric furnace which is configured so as to limit the specific power consumption.

These objects, together with others which will appear more clearly below, are achieved by a method for melting vitrifiable materials, in particular for the production of vitreous mosaic materials and ceramic frits as well as for the is vitrification of waste, in accordance with claim 1.

As a result of this method, it will be possible to reduce the time required for changing the primary batch and the power consumption.

According to a further aspect, the invention provides an electric furnace for melting vitrifiable materials, in particular for the production of vitreous mosaic materials and ceramic frits as well as for the vitrification of waste, where the primary material is frequently changed, in accordance with claim 5.

Preferably, the electrodes are substantially cylindrical and straight and have a length at least equal to the distance between the opposite side walls of the tank and are arranged substantially parallel to each other at a given mutual distance so as to optimize the distribution of the electric current inside the molten bath.

Owing to this characteristic feature it is possible to obtain a homogeneous distribution of the power within the molten bath.

Conveniently the electrodes have one longitudinal end rigidly secured to a side wall of the tank and the other longitudinal end in contact with the opposite side wall so as to be slightly compressed or tensioned at the tip. As a result of this measure it is possible to ensure the electrical continuity even after possible breakage or cracking of the electrodes. Moreover, the characteristic high degree of wear of the tips is avoided.

BRIEF DESCRIPTION OF THE DRAWINGS

Further features and advantages of the invention will be more clearly understood in the light of the detailed description of some preferred, but not exclusive embodiments of the electric furnace according to the invention, illustrated by way of a non-limiting example with the aid of the accompanying plates of drawings in which.

DETAILED DESCRIPTION OF PREFERRED EMBODIMENT

Figure 1:
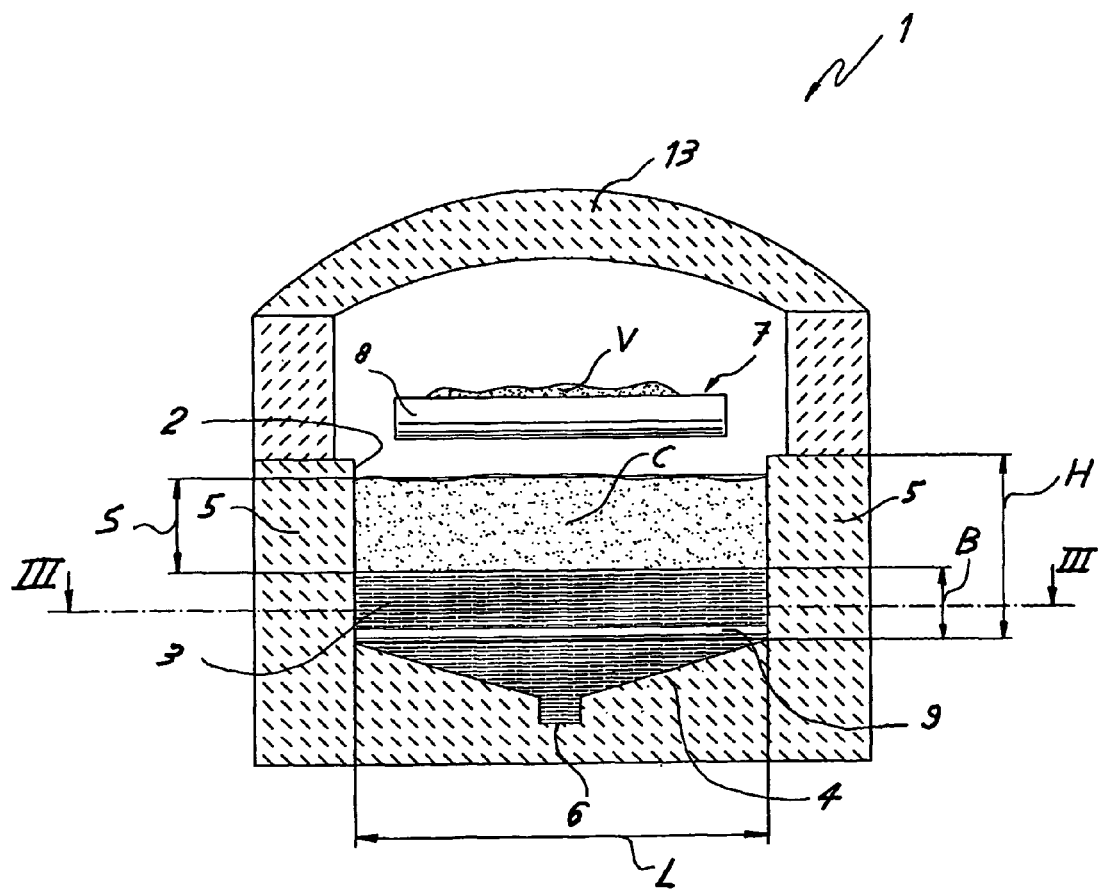
FIG. 1 shows a sectioned side view of the furnace as a whole.

With particular reference to the said figures, the description below relates to an electric furnace for melting vitrifiable materials, in particular for the manufacture of vitreous mosaic materials and ceramic frits as well as for the vitrification of waste according to the invention, said furnace being denoted in its entirety by the reference number 1.

The furnace 1 comprises a melting tank 2 for containing a molten bath 3, which is essentially formed by a floor 4 and by side walls 5, which are often referred to as "palisades". Suitable discharge channels 6 are formed in the floor 4 in order to allow and facilitate the removal of the molten materials from the tank 2.

Movement and transporting means 7 are envisaged for introducing into the tank 2 a primary batch of vitrifiable materials V and for depositing a covering layer C on the molten bath 3. The movement and transporting means 7 may consist of a conveyor belt 8 or similar devices which pass through the mouth of the furnace, not shown in the drawings.

During start-up of the furnace, conventional heating means, preferably of the combustion type (not shown in the drawings and of a type known per se) are used for melting, at least partially, the vitrifiable materials V and for forming, in this way, the molten bath 3. After the molten bath 3 has been created, it is possible to commence heating of the furnace using electric means.

Conveniently, electric heating of the furnace is performed by means of an electric current diffused in the molten bath 3, which current generates heat as a result of the Joule effect. For this purpose, a plurality of electrodes 9, which have a predetermined shape and position, are provided inside the tank 2 in such a way that the electric current circulates between them.

The electrodes 9 may be supplied with a single-phase alternating current R-S, generally by connecting half of the electrodes 9 to the conductor R and the remaining half to the conductor S. In another example of embodiment, the electrodes may be supplied with a three-phase alternating current R-S-T.

According to the invention, the electrodes 9 substantially rest on the floor 4 so as to reduce to a minimum the head B of the molten bath 3, with a consequent reduction in the time required to change the primary batch and the power consumption.

Preferably, the electrodes 9 are cylindrical and straight and are arranged substantially parallel to each other at a given mutual distance D,D' so as to optimize the distribution of the electric current inside the molten bath 3.

The length L of the electrodes 9 is at least equal to the distance between the opposite side walls of the tank 2. In this way the surface area of the electrodes 9 in contact with the materials of the molten bath 3 is increased. Moreover, the electrodes 9 have one longitudinal end rigidly secured to a side wall 5 of the tank and the other longitudinal end in contact with the opposite side wall 5 so as to be slightly compressed or tensioned at the tip. As a result of the ample area of contact between the electrodes 9 and the molten bath 3 and the absence of electrodes having their tips freely immersed in the molten bath 3, it is possible to limit the current intensity and consequently the wear phenomena.

The stresses associated with unforeseeable thermal settling movements could give rise to breakage fissures or cracks. The slight compression to which the electrodes 9 are subject helps ensure the electrical continuity also in the case of breakage or cracking of the electrodes 9.

The side walls 5 of the tank 2 have a minimum height H greater than the maximum value of the head B of the molten bath 3, plus the maximum thickness S of the covering layer C. This minimum height H of the side walls 5 of the tank 2 may be between 35 to 60 cm if the diameter of the electrodes 9 is between 1" and 2½". If, on the other hand, the diameter of the electrodes 9 is between 1½" and 2", then the minimum height H of the side walls 5 is preferably between 40 and 60 cm.

Since the diameter of the electrodes 9 is comparable with the head B of the molten bath 3, the electrodes could hinder discharging of the molten glass. For this reason, the discharge channels 6 extend at least partially underneath the electrodes 9.

The discharge channels 6 may comprise at least one main receiving canal 10 connected to the outside of the furnace by means of a discharge gully 11. The main canal 10 may have a direction substantially parallel to the electrodes 9.

In another embodiment, the main canal 10 may have a direction substantially perpendicular to the electrodes 9. Moreover, it is possible to use also a plurality of secondary receiving canals 12 connected to the main canal 10, particularly in the configuration where the electrodes 9 are perpendicular to the main canal 10.

Conveniently, the main canal and secondary canals 10, 12 are transverse to each other and extend completely underneath the electrodes 9.

The furnace is closed at the top by a crown 13 which is situated above the floor 4 and the side walls 5.

Operationally speaking, a primary batch of vitrifiable materials V is introduced into the tank 2 via the inlet mouth of the furnace (not shown in the drawings) and by means of movement and transporting means 7.

Solely during the initial cold furnace stage, the charge of materials V is pre-heated using conventional heating means so as to melt them at least partly and form the molten bath 3 with a head B. At this point, heating of the furnace is started by energizing the electrodes 9 with single-phase or three-phase electric current so as to melt completely the vitrifiable materials V.

A covering layer C of vitrifiable materials in the solid state is deposited on the upper surface of the molten bath 3 so as to contain the heat dispersions of the bath and screen the crown 13 of the furnace.

Owing to the position of the electrodes 9 resting over the whole of their length on the floor 4, a reduction in the head B of the molten bath 3 is obtained, with a consequent reduction in the time required for changing the primary batch and the power consumption.

Figure 5:
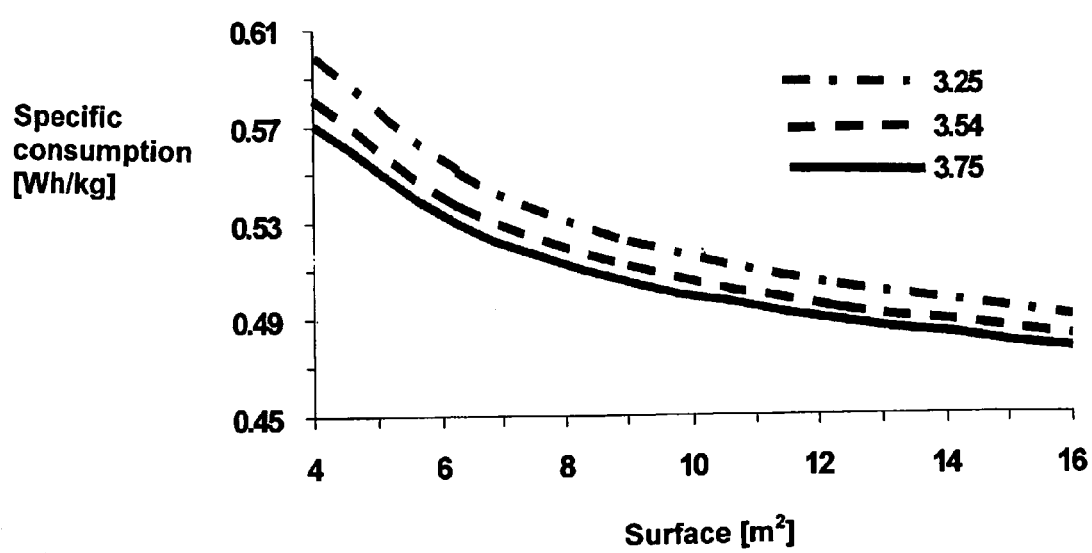
FIG. 5 shows graphs of the specific electrical consumption parameterized according to the value of the average daily gather.

FIG. 5 shows some graphs which illustrate the specific energy consumption, normalized with respect to the unit of mass of glass produced, in the case of a furnace with a floor having a square shape according to the invention, and parameterized for the specific gather [ton/(day $m^2_{floor}$)].

The specific consumption is dependent upon both the dimensions of the furnace and the quantity of glass produced, expressed as tons of glass output per day. With an increase in the dimensions there is obviously an increase in both the dispersions and the quantity of glass which is produced daily.

From the ratio of dispersion to quantity of glass produced it emerges that for the same specific gather (normalized with respect to the surface area of the floor), the power expended per unit of product decreases with an increase in the surface area of the floor.

As can be seen from FIG. 5, the specific consumption also decreases with an increase in the specific gather. In the example of calculation, values of a specific gather ranging from 3250 a 3750 kg/(day $m^2_{floor}$) have been used.

It can be seen how, with a suitable floor surface area and with the abovementioned specific gather values, it is possible to achieve easily specific consumption levels of up to 0.6 kWh/kg.

In operating conditions, the quantity of electrical power which flows within the molten bath 3 depends on the electrical resistivity of the glass, which varies depending on the chemical composition of the glass itself. The consumption of current depends, not only on the difference in potential at the terminals of the immersed electrodes and the electrical resistivity of the molten glass bath, but also in decisive manner on the geometrical distribution of the electrodes.

The confining effect must also be taken into account during the calculation of the electrical resistance between the immersed electrodes. In fact, the volume occupied by the molten glass bath has been reduced compared to a conventional electric furnace. Therefore, the interfaces which delimit the molten bath 3 modify significantly the potential range, and the simplified theory of infinite means, which is usually adopted in large electric furnaces, is no longer valid.

The potential range also depends on the type of electrical power supply used: a single-phase alternating voltage system may be taken into consideration only in small-size furnaces, while the three-phase system is generally preferable and obligatory in large-size furnaces.

A homogeneous distribution of the power in the molten bath is essential for correct operation of an electric furnace. A second condition, which is of an operational/design nature, relates to the limit values of the current density in the glass at the electrodes 9.

In the case of industrial glass it is advisable not to exceed a current density of 2 A/cm2, while in the case of glass which is of a high quality or particularly rich in substances which are corrosive for the electrodes 9, it is advisable not to exceed the density of 0.7 A/cm2. This second condition results in the need to design the electrodes 9 with a considerable length and, because of the low head B of the glass, said electrodes must be inserted laterally into the side wall 5 and must rest on the floor 4 along the whole of their length.

Figure 2:
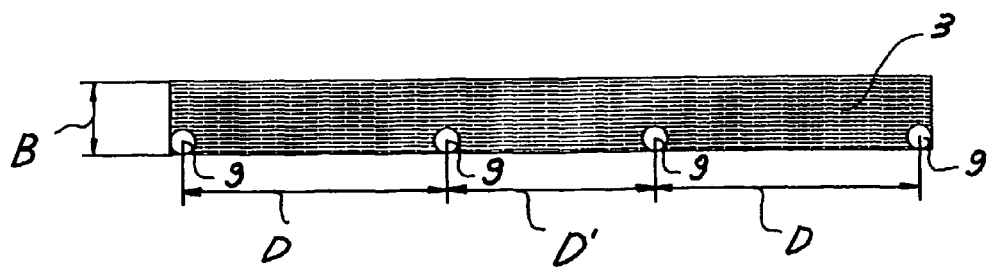
FIG. 2 shows a cross-section through the molten bath and the electrodes.
Figure 3:
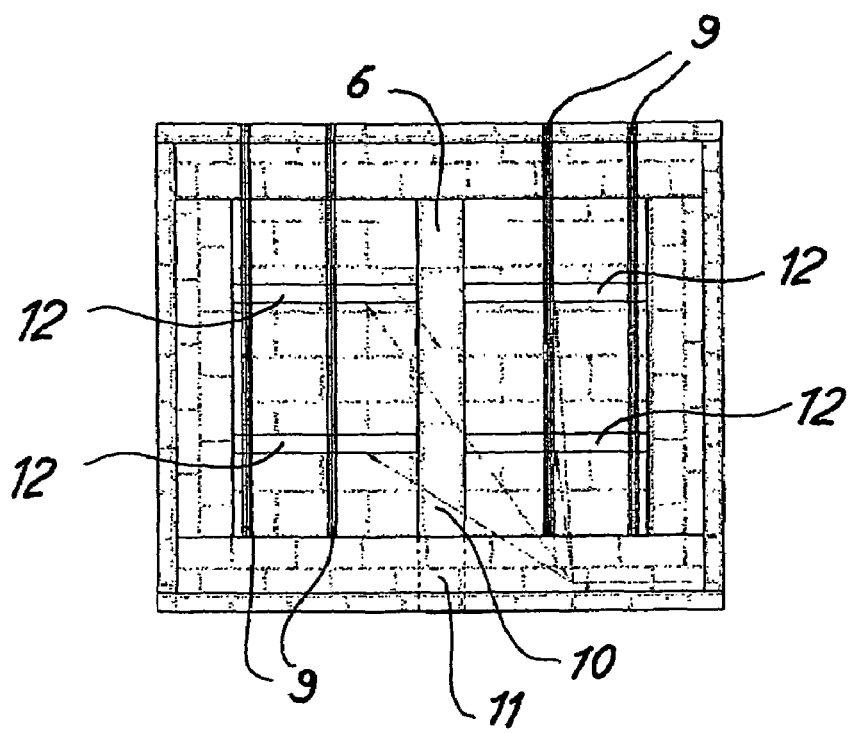
FIG. 3 shows a plan view of a preferred example of embodiment of the furnace according to the invention.
Figure 4:
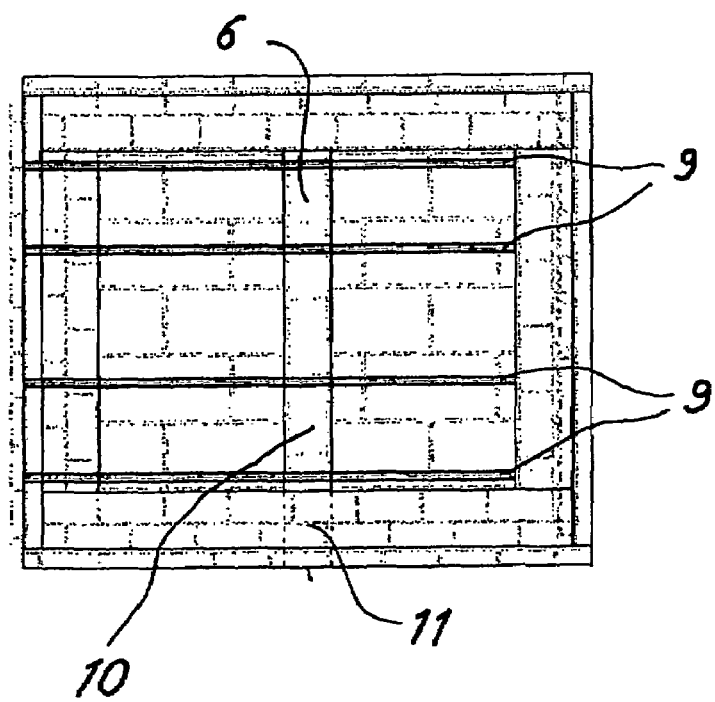
FIG. 4 shows a plan view of a second preferred example of embodiment of the furnace according to the invention.

With reference to FIG. 2, Table 1 shows an example of calculation of the applied voltage Vapp, the current I and the currently density i at the electrodes 9 (effective values) as a function of the mutual distances D,D' between the electrodes 9.

The calculation refers to a furnace with floor 4 having dimensions of about 4 $m^2$, with a square plan design, the power of which has been calculated as being approximately 343 kW at the specific gather of 3540 kg/(day $m2_{floor}$).

TABLE 1

Characteristic voltage and current data (effective values) of the furnace according to FIG. 2 with single-phase power supply ($\rho_{glass} \sim 3.45\ \Omega\ cm$). The condition where there is uniform distribution of the currents in the molten glass is shown in bold.

| D [cm] | D' [cm] | $I_{tot}$ [A] | V [V] | $I_1 = I_4$ [A] | $i_1 = i_4$ [A/cm$^2$] | $I_2 = I_3$ [A] | $i_2 = i_3$ [A/cm$^2$] | $I_D$ [A] | $I_{D'}$ [A] |
|---|---|---|---|---|---|---|---|---|---|
| 67.5 | 60.0 | 4525 | 76 | 1454 | 0.45 | 3071 | 0.96 | 1454 | 1617 |
| 65.0 | 65.0 | 4520 | 76 | 1497 | 0.47 | 3023 | 0.94 | 1497 | 1526 |
| 64.4 | 66.2 | 4520 | 76 | 1507 | 0.47 | 3014 | 0.94 | 1507 | 1507 |
| 62.5 | 70.0 | 4524 | 76 | 1539 | 0.48 | 2984 | 0.93 | 1539 | 1445 |
| 60.0 | 75.0 | 4535 | 76 | 1582 | 0.49 | 2953 | 0.92 | 1582 | 1371 |
| 55.0 | 85.0 | 4577 | 75 | 1668 | 0.52 | 2909 | 0.91 | 1668 | 1242 |
| 50.0 | 95.0 | 4645 | 74 | 1758 | 0.55 | 2888 | 0.90 | 1758 | 1130 |
| 45.0 | 105.0 | 4741 | 72 | 1855 | 0.58 | 2886 | 0.90 | 1855 | 1031 |

$I_n$ current in the electrode n
$i_n$ current density at the glass-electrode interface n
$I_{D(D')}$ current in the glass between lateral and central electrode (D', between central electrodes) of the melting tank according to FIG. 2

In the case where the furnace is powered with a three-phase alternating voltage R-S-T, the current density at the electrodes 9 decreases. The following Table 2 shows the same calculations illustrated in Table 1. In this case, with reference to FIG. 2, the two external electrodes are connected to the phase R, the second electrode from the left is connected to the phase S and the remaining electrode to the phase T, resulting in a triangular connection which is powered symmetrically.

TABLE 2

Characteristic current data (effective values) of the furnace according to FIG. 2 with three-phase power supply ($\rho_{glass} \sim 3.45\ \Omega\ cm$). The condition where there is uniform distribution of the currents in the molten glass is shown in bold.

| D [cm] | D' [cm] | $I_1 = I_4$ [A] | $J_{ST}$ [A] | $I_2 = I_3$ [A] | $I_R$ [A] | $i_1 = i_4$ [A/cm$^2$] | $i_2$ [A/cm$^2$] | $I_D$ [A] | $I_{D'}$ [A] |
|---|---|---|---|---|---|---|---|---|---|
| 67.27 | 60.45 | 1462 | 1605 | 2779 | 2779 | 0.464 | 0.883 | 1462 | 1953 |
| 65.00 | 65.00 | 1499 | 1525 | 2742 | 2842 | 0.476 | 0.871 | 1499 | 1867 |
| 62.50 | 70.00 | 1540 | 1445 | 2709 | 2909 | 0.489 | 0.861 | 1540 | 1781 |
| 60.00 | 75.00 | 1580 | 1373 | 2683 | 2976 | 0.502 | 0.852 | 1580 | 1701 |
| 57.50 | 80.00 | 1621 | 1307 | 2663 | 3043 | 0.515 | 0.846 | 1621 | 1627 |
| 57.37 | 80.26 | 1623 | 1304 | 2662 | 3047 | 0.516 | 0.846 | 1623 | 1623 |
| 55.00 | 85.00 | 1663 | 1247 | 2649 | 3111 | 0.528 | 0.842 | 1663 | 1557 |
| 52.50 | 90.00 | 1705 | 1190 | 2640 | 3180 | 0.542 | 0.839 | 1705 | 1492 |

$I_n$ current in the electrode n
$i_n$ current density at the glass-electrode interface n
$I_{R\ (S,T)}$ phase current R (S, T); in the case of the central electrodes the current in the electrode is equal to the phase current S and T
$J_{ST}$ line current between the phases S and T
$I_{D(D')}$ current in the glass between lateral electrode and central electrode (D', between central electrodes) of the melting tank according to FIG. 2

From that described above, it is clear that, with the method according to the invention and its implementation by means of an electric furnace in accordance with the claims, it is possible to achieve the predefined objects and in particular perform in a cost-effective manner the melting of vitrifiable materials, in particular for the manufacture of vitreous mosaic materials and ceramic frits as well as for the vitrification of waste, using electric power.

In particular, with the method according to the invention it is possible to provide a cold-crown furnace which is able to lower the temperature and the quantity of polluting substances contained in the fumes discharged into the atmosphere, limiting the specific power consumption. Moreover, with the invention it is possible to reduce the time required for changing the vitrifiable material.

The method and the furnace according to the invention are subject to numerous modifications and variations all falling within the inventive idea expressed in the claims. All the details may be replaced by other technically equivalent elements, and the materials may vary according to requirements without departing from the scope of the invention.

Even though the object of the invention has been described with particular reference to the accompanying figures, the reference numbers used in the description and in the claims are used in order to facilitate understanding of the invention and do not limit in anyway the scope of protection claimed.

The invention claimed is:

1. A method for melting vitrifiable materials, comprising the steps of:
   providing a melting tank having a floor and side walls made of refractory material for containing a molten bath, with a predetermined head and at least one channel for discharging molten materials from the molten bath;

introducing a primary batch of vitrifiable materials into said tank via an entry mouth thereof;

providing, inside said tank, a plurality of electrodes having a predetermined shape and length, said electrodes having a substantially constant cross-section over their entire length and being so positioned as to melt completely said vitrifiable materials by means of diffused electric currents;

depositing a covering layer of vitrifiable materials in the solid state onto the upper surface of said molten bath so as to contain the dispersion of heat from the bath and screen the upper surface of the furnace;

wherein said electrodes have one longitudinal end rigidly secured to a side wall of the tank and the other longitudinal end in contact with the opposite side wall.

2. The method according to claim 1, wherein the volume of the primary batch is limited by containing said head within predetermined values depending on the diameter of the electrodes.

3. The method according to claim 2, wherein said head is kept within values which are between twice and six times the average diameter of the electrodes, with said average diameter being between 1" and 2".

4. The method according to claim 3, wherein the power consumption is kept less than or equal to 0.6 kWh for each kilogram of glass produced.

5. An electric furnace comprising:
a melting tank for containing a molten bath with a floor, side walls, channels for discharging molten materials from the molten bath;

means for introducing into said tank a primary batch of vitrifiable materials and for depositing a covering layer on the molten bath having a predetermined head;

a plurality of electrodes situated inside said tank so as to melt and keep in the molten state said vitrifiable materials by means of diffused electric currents, said electrodes having an overall length and a substantially constant cross-section over said length and a predetermined position;

a crown situated above said floor, all said electrodes being so positioned inside the tank to substantially rest at the same level on said floor so as to reduce to a minimum the head of the molten bath, with a consequent reduction in the time required to change the primary batch and the power consumption wherein said electrodes have one longitudinal end rigidly secured to a side wall of the tank and the other longitudinal end in contact with the opposite side wall.

6. The furnace according to claim 5, wherein said electrodes are substantially cylindrical and straight and are arranged substantially parallel to each other.

7. The furnace according to claim 5, wherein said electrodes are slightly compressed or tensioned at the tip.

8. The furnace according to claim 5, wherein the distance between said electrodes is selected so as to optimize the distribution of the electric current inside the molten bath.

9. The furnace according to claim 5, wherein the side wall of said tank has a minimum height which is greater than the a combined height of the molten material and said primary batch deposited thereon.

10. The furnace according to claim 9, wherein said minimum height of the side walls of the tank is between 35 and 60 cm with the diameter of said electrodes between 1" and 2½".

11. The furnace according to claim 10, wherein said minimum height is between 40 and 60 cm with the diameter of said electrodes between 1" and 2½".

12. The furnace according to claim 5, wherein said discharge channels extend in said floor at least partially underneath the level of said electrodes to prevent the electrodes from hindering the flowing out of the molten bath.

13. The furnace according to claim 5, wherein said discharge channels comprise at least one main receiving canal connected to the outside of the furnace by means of a discharge gully.

14. The furnace according to claim 13, wherein said discharge channels comprise a plurality of secondary receiving canals connected to said main canal.

15. The furnace according to claim 13, wherein said main and secondary canals are transverse to each other and extend completely underneath said electrodes.

* * * * *